United States Patent [19]

Batson

[11] Patent Number: 4,728,048

[45] Date of Patent: Mar. 1, 1988

[54] SPOOLING DEVICE

[76] Inventor: Jerry W. Batson, 13 Rim Rd., Kilgore, Tex. 75662

[21] Appl. No.: 60,529

[22] Filed: Jun. 11, 1987

[51] Int. Cl.⁴ .................. B65H 54/00; B65H 54/40
[52] U.S. Cl. ........................... 242/47; 242/53;
   242/54 R; 242/68.3; 242/96; 242/106;
   242/129.51
[58] Field of Search ............... 242/47, 48, 49, 50,
   242/51, 52, 53, 18 R, 20, 23, 24, 25 R, 46.2, 54
   R, 96, 99, 106, 68.3, 85, 104, 129.51

[56] References Cited
U.S. PATENT DOCUMENTS 2,007,705  7/1935  Brugger ................. 242/129.51
3,295,787  1/1967  Golonka ................ 242/106
3,647,155  3/1972  Jorgenson ............. 242/106
3,973,741  8/1976  Dean .................... 242/106 X
4,007,886  2/1977  Kaminstein ........... 242/106 X
4,196,864  4/1980  Cole ..................... 242/106 X
4,310,126  1/1982  Norleen ................ 242/47
4,540,136  9/1985  Rauch ................... 242/106

Primary Examiner—Stanley N. Gilreath

[57] ABSTRACT

A spooling device for winding line on a spool using a power drill or the like where a spindle has a spring biased annular retainer ring slidably facing an annular cone member. A spool member to receive line is disposed between the retainer ring and cone member which adapts to the bore diameter of the spool member.

5 Claims, 2 Drawing Figures

U.S. Patent

Mar. 1, 1988

4,728,048

SPOOLING DEVICE

FIELD OF THE INVENTION

This invention relates to spooling devices, and more particularly, to a handyman type of spooling device which is simple and inexpensive in construction and utilizable with hand tools for spooling line on a spool or reel.

BACKGROUND OF THE INVENTION

It is common to buy or acquire thread, rope, twine, line or the like in bulk quantities where there is a subsequent transfer from a bulk quantity source of line to a smaller spool. One common application of this nature is plastic or nylon line used in weed trimmers where one can purchase up to 500 feet or more of line at a bulk price and requires 20 to 50 feet of line on a machine spool dependent on size of line. Another example is fishing line which can be bought in large bulk quantities and transferred to spools of lesser capacity. Other examples can readily come to mind.

THE PRESENT INVENTION

The present invention concerns a spooling device which is simple in construction, versatile in operation and adaptable for use as a power drill attachment or accessory. In the present invention, a cylindrically shaped spindle is provided where the spindle can be chucked in a power drill. On the spindle is a spring biased annular retainer ring and a movable annular cone member. The spring biased retainer ring and the cone member adapt to the core or bore of a spool to receive a line. The spindle is rotatable by a power drill or the like.

THE DRAWINGS

Figure 1:
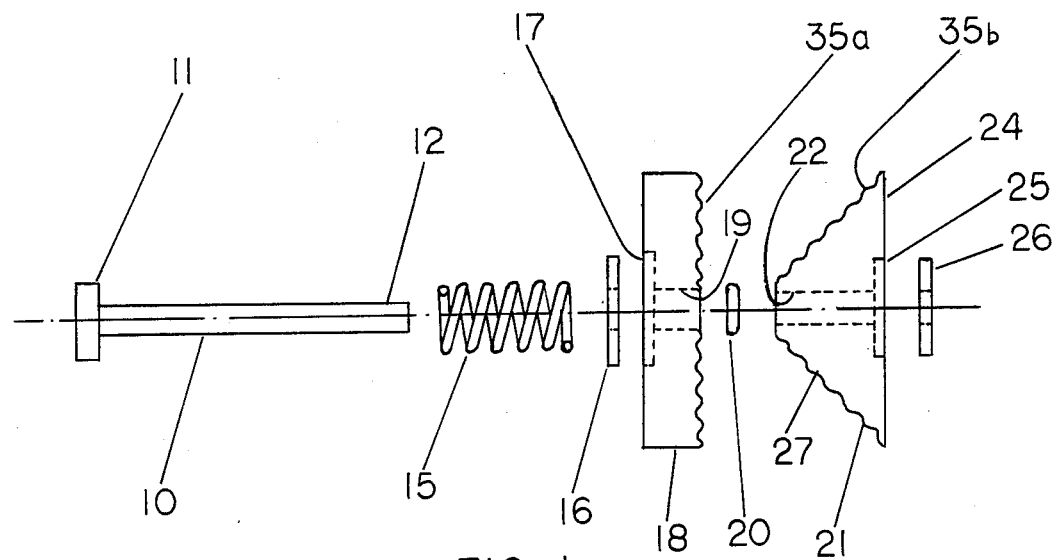
Figure 2:
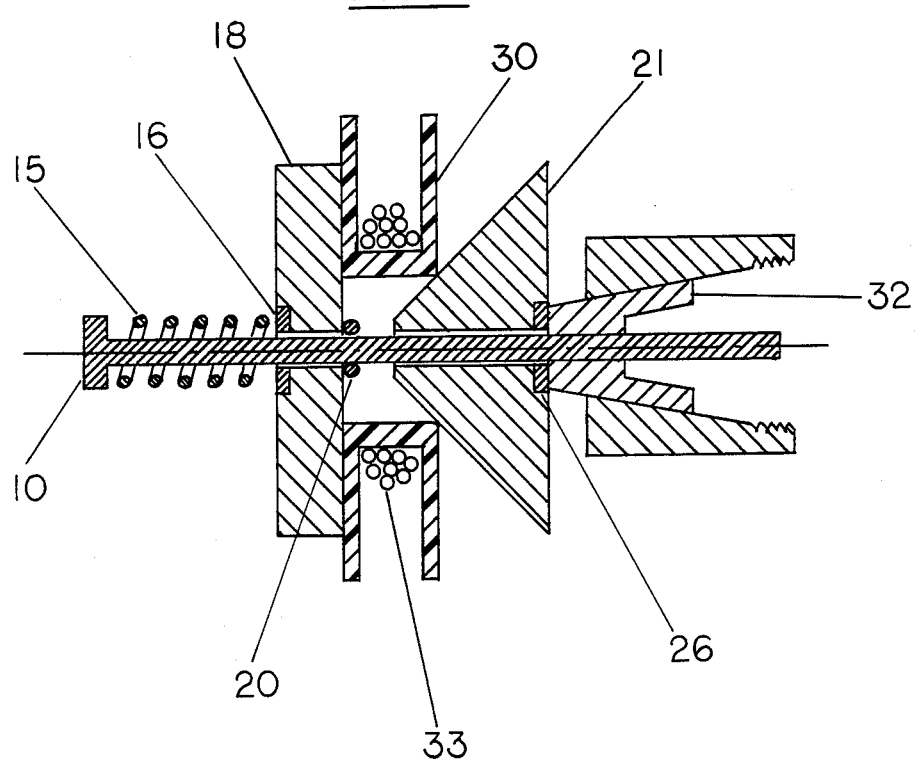

FIG. 1 is an exploded view in cross-section of the component parts of the spooling device of the present invention; and FIG. 2 is a view in cross-section showing the spooling device in an assembled operating condition.

DESCRIPTION OF THE PRESENT INVENTION

Referring now to FIG. 1, the present invention includes a cylindrically shaped spindle 10 with a retaining head 11 at one end and an opposite end 12 adapted to be received in the chuck of a power drill. If desired the end 12 can be flattened or roughened for greater gripping power in a chuck.

A coiled spring member 15 is slidably received on the spindle 10 and located between the retaining head 11 and an annular washer 16. The washer 16 is slidably mounted on the spindle 10 and receivable in an annular recess 17 in an annular ring member 18.

The ring member 18 has a bore 19 which slidably receives the spindle 10. A resilient O-ring 20 is sized to be frictionally received on the spindle 10 and serves to retain the retainer ring 18 on the spindle. A frusto conical shaped cone member 21 with a bore 22 sized to slidably receive the spindle 10 is received by the spindle. The rearward surface 24 of the cone member 21 is recessed at 25 to receive a washer 26. The angle of the inclined surface 27 of the cone member 21 determines the range of bores or spool diameters that the cone member 21 can accommodate. I prefer an angle of 42° with respect to the horizontal axis for the cone member 21.

As shown in FIG. 2, a spool or reel 30 to be wound with line is disposed between the ring member 18 and the cone member 21 with the cone member 21 bearing against the chuck jaws 32. By inserting the spindle 10 into the chuck jaws 32, the necessary compression force can be obtained on the spring 15 to insure rotation of the spool 30 with the ring 18 and cone member 21 and spooling of a line 33 on the spool 30 from a bulk source of line.

As shown in FIG. 1, the outer contacting surfaces can have corrugations 35a, 35b for an increased gripping function or can be lined with felt or the like.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A line spooling device comprising:
    a spindle member having one end thereof adapted for gripping reception in a rotatable drive source and having an opposite terminal end providing a spring stop,
    a first annular ring member slidably disposed on said spindle member,
    a second annular ring member slidably disposed on said spindle member,
    said first ring member and said second ring member respectively having a first facing surface perpendicular to the central axis of the spindle member and a second facing surface with a frusto conical configuration relative to the central axis of the spindle, said first and second facing surfaces being adapted to centrally mount therebetween spool member with a bore sized to engage the frusto conical configuration, and
    spring means on said spindle member resiliently biasing said first and second ring members toward one another when the spindle member is in a drive source so as to rotatably support a spool member for rotation with said spindle member.

2. The apparatus as set forth in claim 1 wherein said spring means are disposed between the terminal end of said spindle member and said first ring member.

3. The apparatus as set forth in claim 2 wherein an annular resilient O-ring is disposed on said spindle member between said first and second ring members.

4. The apparatus as set forth in claim 1 wherein said first and second ring members have surface gripping means for gripping a spool member.

5. The apparatus as set forth in claim 1 wherein said frusto conical surface, is at an angle of 42° with respect to the axis of said spindle.

* * * * *